Nov. 12, 1935. I. B. ENGLE 2,020,403
PROCESS FOR PRODUCING MINERAL FIBER
Filed June 19, 1933 2 Sheets-Sheet 1
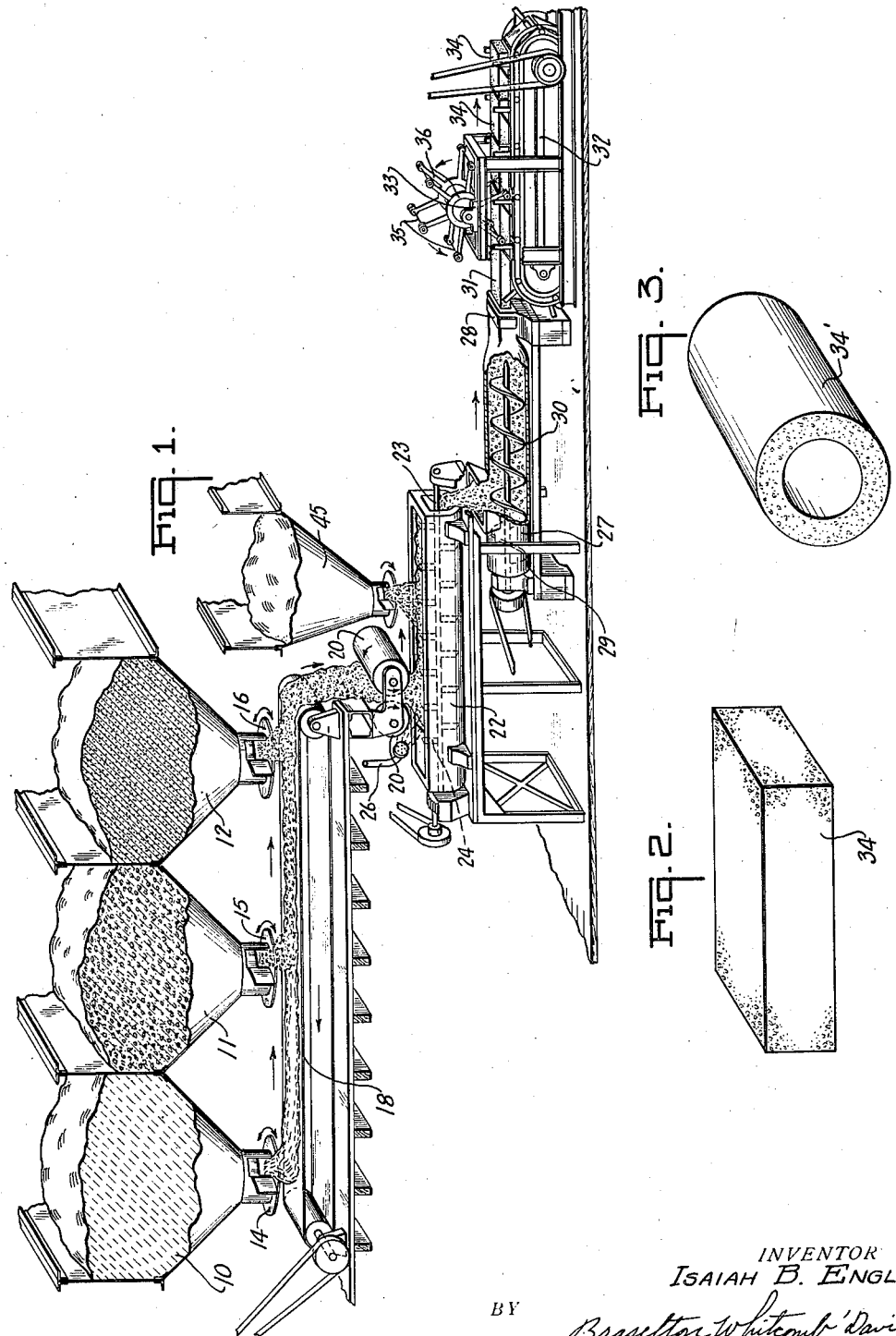
INVENTOR
ISAIAH B. ENGLE
BY
Braselton, Whitcomb 'Davies
ATTORNEY Nov. 12, 1935.   I. B. ENGLE   2,020,403
PROCESS FOR PRODUCING MINERAL FIBER
Filed June 19, 1933   2 Sheets-Sheet 2
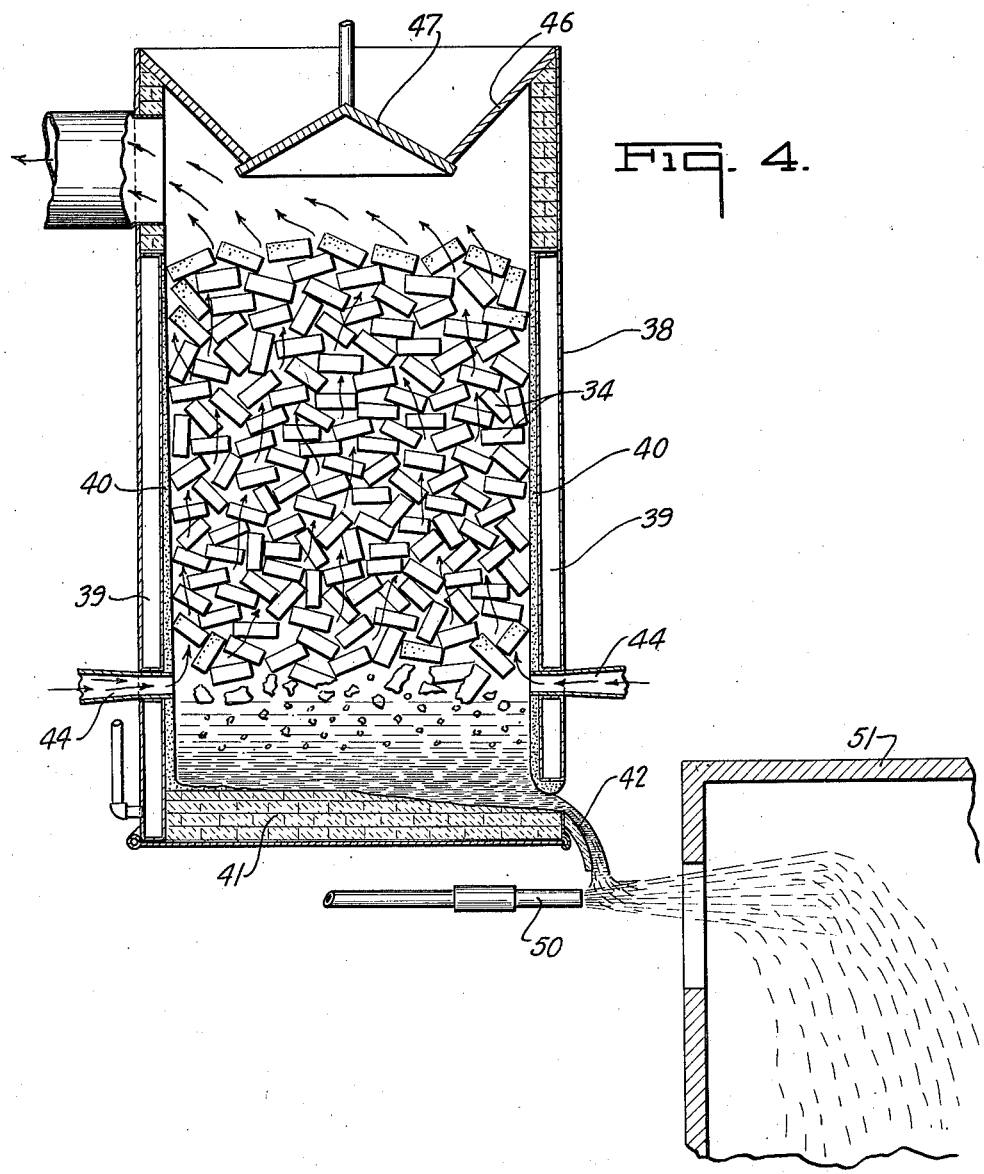

Patented Nov. 12, 1935

2,020,403

UNITED STATES PATENT OFFICE 2,020,403

PROCESS FOR PRODUCING MINERAL FIBER

Isaiah B. Engle, Tiffin, Ohio

Application June 19, 1933, Serial No. 676,429

9 Claims. (Cl. 49—77.5)

This invention relates to the processing or fabrication of materials for use in producing mineral fiber or rock wool and to method or process of fabricating such composition and producing the mineral fiber.

In the past, material known as mineral wool has been produced or fabricated by processing rock in a natural state, as for example reducing argillaceous limestone in the presence of a combustible to a melted condition and afterwards blowing or shredding to produce the mineral wool. The argillaceous limestone or natural rock suitable for producing mineral wool is formed in only limited portions of the country, and therefore its cost of production and transportation of the product in the past has been very high.

This invention embraces the production or fabrication of a composition of normally waste materials from which mineral wool may be produced at a very low cost. The invention has for an object the processing of otherwise waste materials to form articles having definite configuration as for example blocks, briquettes, cylindrical forms or the like composed of various constituents, each constituent being a normally waste material, and further processing these composition articles as to produce the finished mineral fiber.

Another object of the invention resides in the synthetic production of mineral fiber from composition articles of a character which simulate in chemical and physical reactivation, that obtained in the processing of the natural argillaceous limestone rock, but which may be easily produced at a much less cost than has been heretofore obtainable.

A further object is the provision of composition articles of this character produced in a form such that a great number of the articles may be placed in a processing furnace or cupola in the presence of a comparatively small amount of combustible as to permit the passage of air and gases through the pile formation of articles whereby the production of mineral fiber is facilitated in a comparatively short space of time.

Further objects and advantages are within the scope of this invention such as relate to the arrangement, operation and function of the related elements of the structure, to various details of construction and to combinations of parts, elements per se, and to economies of manufacture and numerous other features as will be apparent from a consideration of the specification and drawings of certain forms of the invention, which may be preferred, in which Figure 1 is a semi-diagrammatic view of steps of the process forming part of the invention;

Figure 2 is an isometric view of an article formed in carrying out steps in the process of the invention;

Figure 3 is a modified form of article formed by the process;

Figure 4 is a sectional view illustrating certain steps in the process of my invention and the utilization of articles formed during certain stages of the process.

In carrying out or practicing the invention, I have found that mineral wool may be produced from materials otherwise waste products from quarrying and particularly the quarrying of limestone. I have found that in substantially all quarrying operations the desirable rock from a commercial and practical viewpoint lies considerably beneath the surface above which exists a quantity or layer of clay or "over-burden". It is also known that the quantity of waste stone or residuum of quarrying operations sometimes called "fines" or otherwise waste limestone at the average plant ranges from between 7 to 20 per cent of the useful and commercially usable quarried rock. In all normal quarrying operations the stripped clay or "over-burden" must be hauled away and disposed of as waste.

In carrying out the present invention, I have found that the "fines" or waste limestone may be mixed with the stripped or waste clay in proportions depending upon the chemical compositions of these respective materials existing in various localities and by suitably processing the same into manufactured or fabricated articles having physical characteristics of such nature that they may be placed in a retort or cupola in a manner that there will be air interstices or passages between the articles, and through use of suitable fuel, a glasseous or molten slag is produced which may be further processed to produce mineral fiber. I have also found that various fuels may be used as a component part of the composition articles of my invention, or the fuel may be charged into the retort or cupola as a separate material interspersed or laid between successive layers of the articles, which when heated by the burning fuel produces a molten slag. For example, I have found that very fine or waste coal known in the trade as anthracite "culm" may be used advantageously. I have also found that fine or waste coke, in the trade known as coke "breeze" forms a highly satisfactory fuel.

I do not, however, wish to be limited to the use of the particular fuels mentioned as other fuels have been found satisfactory in processing and melting composition articles, such as oil, natural gas, and the like, but the otherwise waste fuels, such as anthracite "culm" and coke "breeze" form a particularly efficient and inexpensive fuel.

Figure 1 illustrates the carrying out of a series of steps forming part of the process of my invention and, as illustrated, there is provided a plurality of hoppers 10, 11 and 12 which are adapted to receive and contain ingredients entering into the fabrication of the composition articles which have definite configuration for purposes hereinafter explained. For example, receptacle 10 may contain the stripped or waste clay, receptacle 11 may contain the "fines" or waste limestone, and if it is desired that the fabricated articles contain a fuel constituent, receptacle 12 may be utilized to contain the fuel forming a part of the composition.

Gates or valves 14, 15, 16, preferably cooperating with mechanical automatic feeders 17 are positioned beneath the hoppers or receptacles containing the ingredients of the composition and are made adjustable so as to regulate or vary the percentages of or amounts of the several constituents making up the composition articles. As illustrated, the various constituents are carried by means of a belt or conveyor 18, preferably of the endless type, to a position where they are permitted to pass through pulverizing or crushing rolls 20 into a pug mill or mixing arrangement. The pug mill may be of a suitable construction as illustrated comprising an elongated casing 22 within which is rotatably mounted a shaft 23 having radially projecting blades or agitators 24 which serve to thoroughly agitate or mix the ingredients to a more or less homogeneous admixture as well as to simultaneously convey the mixture to an extruding machine 27. In some instances, depending upon the water content which more or less determines the degree of plasticity of the clay or "over-burden", it may be found advantageous to add water, or other fluid as by means of a jet 26 in order to give the clay and constituents sufficient plasticity that the materials in the resulting articles may have sufficient coherence or bonding characteristics as to maintain the articles in a definite configuration. From the pug mill the admixture of constituents passes into an extruding machine 27 at the end of which is a suitable die or configuration 28. Positioned longitudinally of the drum or receptacle 29 forming part of machine 27 is a spiral screw 30 which is rotated in a direction to carry the admixture to the die 28 and cause an extrusion of the composition material therethrough, the die imparting a predetermined definite configuration to the material in the embodiment illustrated, this configuration being of rectangular formation as illustrated at 31. The articles may be made by other suitable means as for example ceramic presses or the like in lieu of the die 28. The material extruded through the die 28 is carried by means of a conveyor or other suitable means 32 to a severing means 33 in the embodiment illustrated including a plurality of wires 35 carried by spiders 36, the wires 35 being adapted to successively engage the length of extruded material severing blocks or briquettes therefrom as illustrated at 34 in Figure 2.

While I have found that the briquette configuration as illustrated at 34 is satisfactory for uses hereinbefore explained, other configurations of composition material in article formation may be advantageously used. For example, Figure 3 illustrates a cylindrical configuration of composition article 34' cut to predetermined desirable lengths and having a central bore therethrough to permit the passage of air and flue gases as hereinafter explained. While I have found that configurations of this general character are very effective and efficient in carrying out the process of the invention, it is to be understood that I do not wish to be limited to the particular configurations of composition articles as illustrated but that any suitable configuration of article which will afford, when a plurality of the articles are stacked or piled together, a plurality of interstices or passages will exist between said articles for permitting the passage of flue gases, and such configurations as cubes, other multi-sided solids, spheres, half-spheres and other numerous configurations may be used without departing from the spirit and scope of the invention.

The articles 34 after being taken from the conveyor belt 32 may be stacked or put in piles for drying purposes, or if it is desired to convey them direct to the retort or cupola, the drying operation may be dispensed with. The retort or cupola may be of any suitable construction, Figure 4 illustrating a type of water cupola as illustrated at 38 which is surrounded by water jackets 39, the inner walls of the retort being lined with a suitable refractory material 40, the lower portion or bottom of the retort being lined with fire clay 41 or other suitable material, the bottom of which may be made removable or hinged as illustrated for purposes of cleaning. At the bottom of the retort is provided a channel 42 through which the molten stream of composition material may be drawn off. The retort is also provided near its lower extremity with air inlet pipes 44 through which air may be forced under pressure into the retort to facilitate combustion.

As particularly illustrated in Figure 4, the articles 34 are merely dumped into the upper hopper-like end 46 of the retort which is normally closed by means of a valve 47, the articles 34 being of a suitable configuration as hereinbefore explained so that there exists throughout the pile of articles air spaces or interstices to admit the passage of air and flue gases or gases of combustion therethrough. The charge in the cupola consists of a plurality of the articles containing in some instances a certain amount of fuel as hereinbefore explained. After the furnace has been charged, as illustrated, the lowermost articles are ignited by suitable means as a quantity of wood placed next to the bottom of the cupola, and air injected through the tubes 44, the fuel being so intermingled with the constituents making up the articles that the latter are readily and quickly heated to a high temperature causing the limestone and clay to become molten into a glass-like composition or slag which will flow outwardly through the channel 42. Positioned adjacent the end of the channel 42 is a jet of steam 50 or other suitable fluid under pressure which is directed against the molten stream of material causing it to be separated into little pellets which are shot through the air comet wise into a container or room 51. The fine pellets moving at comparatively high velocity through the air are formed with thin thread-like fibers which resemble in accumulated formation a substance similar to and having the visual characteristics of cotton and is known as mineral fiber, wool or rock wool. This substance may afterwards be compressed into bats or other suitable commercial form.

In carrying out the process of my invention, I have found some instances desirable to utilize articles which do not per se, contain the fuel content, but which may be introduced into the retort or cupola as a separate constituent. In carrying out this form of process, the retort or cupola may be charged with alternate layers of articles and fuel and obtain satisfactory results. However, I have found it particularly desirable to compress the fuel into briquettes or articles making up the composition suitable to produce the molten glass-like stream for the fabrication of mineral wool as in this form the fuel is substantially evenly distributed throughout the charge. I have found the fuel content sufficient to melt the composition may vary considerably dependent upon the quality of fuel used, but for practical applications a fuel content not exceeding 25% by weight of the briquette or as fuel separately charged into the cupola has been found to be ordinarily satisfactory.

I have found that in various localities the proportions of clay to stone may be varied within considerable limits depending upon the particular chemical compositions of these ingredients or constituents. I have found that within the limits or proportions of seventy-five per cent stone to twenty-five per cent clay or of twenty-five per cent stone to seventy-five per cent clay will embrace the compositions ordinarily suitable for producing a molten stream of material of a character which will result in a good quality of mineral fiber. As has been above stated, the proportions of clay to stone vary with the particular composition of the limestone and clay, but I have found the following table to set forth the practical limits of the chemical analysis of the ingredients which will produce a satisfactory molten material from waste rock and clay for producing mineral fiber:

| | Percent |
|---|---|
| Silicon dioxide | 35 to 45 |
| Aluminum oxide | 10 to 20 |
| Ferric oxide | 5 to 8 |
| Calcium oxide | 15 to 25 |
| Magnesium oxide | 8 to 25 |

I have found that the average waste limestone and clay composition is embraced in the above schedule of chemical ingredients which will produce a satisfactory molten slag which may be processed into mineral wool. It is to be understood that the clay content of the composition articles may be varied within the proportions above noted depending upon the natural composition of the clay found at the quarry.

I have also found that in some locations where quarrying operations of limestone ar carried on, that the "over-burden" or stripped clay in the natural state has a high content of silicon that it is not easily rendered plastic enough or sufficiently plastic to form a good bond in the briquettes or articles of other configurations as hereinbefore explained. If such conditions are encountered, I have found that a minor percentage, for example five per cent to fifteen per cent of the limestone or limestone "fines" used in the composition may be first calcined or burned to produce lime which may afterwards be sufficiently hydrated to afford a fair degree of plasticity which, when combined with the limestone "fines" and the clay of high silicon or sand content, is sufficient to form a cementitious bond so that the briquette or other suitable configuration can be satisfactorily maintained.

During the step of directing a stream of fluid against the molten material to produce mineral wool, a certain percentage of the molten material, after it is blown to form the mineral fiber, is not reduced to a fibrous state, but remains in the form of small pellets or shot, and some of the mineral fiber formed is not of a commercial marketable character as it may be coarse and heavy or somewhat brittle. In prior processes of fabrication of mineral wool, these pellets or shot and the commercially unusable fiber are waste and have in the past been disposed of as waste. I have found that these waste pellets or shot and the commercially unsuitable fiber may be taken and intermingled with the constituents hereinbefore mentioned in the steps of forming the briquettes and may be in this manner reprocessed to produce mineral wool and in this way eliminate any waste material. In carrying out this phase of the invention a hopper 45 may be placed in any suitable position to convey the waste pellets and commercially unusable fiber into the hereinbefore mentioned primary ingredients forming the briquettes and to this end the hopper 45 may be positioned above the pug mill as illustrated in Figure 1 to convey this material into the composition without disturbing the proportions of the primary ingredients of the composition.

While I have particularly emphasized the utilization of limestone "fines" or otherwise waste stone in carrying out the process as the use of such material lowers the cost of producing mineral wool, it is to be understood that quarried commercially usable limestone may be utilized. It is also to be noted that the quality of the finished mineral fiber may be maintained as through the process of my invention, the amounts of the ingredients or constituents entering into the composition may be varied at will.

It is apparent that, within the scope of the invention modifications and different arrangements may be made other than is herein disclosed, and the present disclosure is illustrative merely, the invention comprehending all variations thereof.

What I claim is:

1. Steps in the process of producing mineral fiber including admixing of clay and limestone, of forming the mixture into articles having predetermined definite configuration, and of subsequently fusing the composition articles to produce molten stream of material, and of directing a stream of fluid against the molten stream of material to separate the latter into fibrous structure.

2. Steps in the process of producing mineral fiber including admixing of clay and limestone to form a homogeneous composition, of forming the mixture into a plurality of articles, and of subsequently melting the composition articles, and of directing a fluid against the molten composition to separate the latter into fibrous structure.

3. Steps in the process of producing mineral fiber, including admixing of clay and limestone to form a homogeneous composition, of forming the mixture into a plurality of composition articles, and of subsequently fusing the composition articles to produce molten glass-like slag, and of directing a stream of fluid under pressure against the molten slag to separate the latter into fibrous structure.

4. Steps in the process of producing mineral fiber, including admixing clay and limestone to form a homogenous composition, of forming the mixture into a plurality of articles having predetermined definite configuration, and of subsequently fusing the composition articles to a molten state and of directing a stream of gas under pressure against the composition in the molten state to carry the latter through the air in divided form at high velocity to form fibrous structure.

5. Steps in the process of producing mineral fiber, including charging a cupola with composition articles of clay, limestone in the presence of fuel, of igniting the charge and fusing the composition articles to a molten state, and of directing a stream of fluid against the composition in the molten state to separate the latter into a fibrous structure.

6. Steps in the process of producing mineral fiber, including charging a cupola with composition articles of clay, limestone and fuel, of igniting the charge and fusing the composition articles to a molten state, and of directing a stream of fluid under pressure against the composition in the molten state to carry the latter through the air in divided form at high velocity.

7. Steps in the process of producing mineral fiber, including admixing of clay and limestone to a form of homogeneous composition, of directing the mixture through a die to form composition articles having predetermined definite configuration, and of subsequently fusing the composition articles to produce molten glass-like slag, and of directing a jet of steam against the molten slag to separate the latter into fibrous structures.

8. Steps in the process of producing mineral fiber, including charging a cupola with composition articles of clay, limestone and fuel, of igniting the charge and fusing the composition articles to a molten state, and of directing a jet of steam under pressure against the composition in the molten state to carry the latter through the air in divided form at high velocity to form fibrous structures.

9. Steps in the process of producing mineral fiber, including an admixture of clay, limestone, waste mineral fiber and glazed mineral pellets, of forming the mixture into articles having predetermined definite configuration, and of substantially fusing the composition to produce a molten stream of material and of directing a stream of fluid against the molten material to produce a fibrous product.

ISAIAH B. ENGLE.